No. 777,548. PATENTED DEC. 13, 1904.
C. SCHMIDT.
MOTOR VEHICLE.
APPLICATION FILED APR. 29, 1904.
NO MODEL. 2 SHEETS—SHEET 1.

No. 777,548. PATENTED DEC. 13, 1904.
C. SCHMIDT.
MOTOR VEHICLE.
APPLICATION FILED APR. 29, 1904.
NO MODEL. 2 SHEETS—SHEET 2.

Witnesses
Inventor
Charles Schmidt
Foster Freeman Watson
Attorneys

No. 777,548.

Patented December 13, 1904.

UNITED STATES PATENT OFFICE.

CHARLES SCHMIDT, OF DETROIT, MICHIGAN, ASSIGNOR TO THE PACKARD MOTOR CAR COMPANY, OF WARREN, OHIO, A CORPORATION OF WEST VIRGINIA.

MOTOR-VEHICLE.

SPECIFICATION forming part of Letters Patent No. 777,548, dated December 13, 1904.

Original application filed June 22, 1903, Serial No. 162,632. Divided and this application filed April 29, 1904. Serial No. 205,594.

(No model.)

*To all whom it may concern:*

Be it known that I, CHARLES SCHMIDT, a citizen of France, residing in the city of Detroit, county of Wayne, and State of Michigan, have invented certain new and useful Improvements in Motor-Vehicles, of which the following is a specification.

The present invention relates to improvements in frames or running-gear for motor-vehicles, and particularly to an improved means for supporting the rear wheels and brake-actuating parts of such a vehicle.

Figure 1:
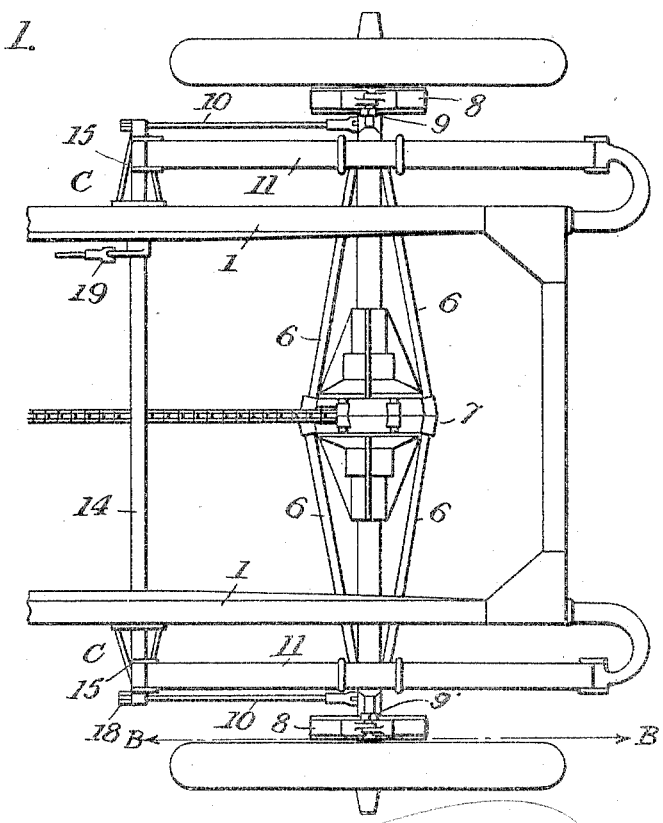
Figure 2:
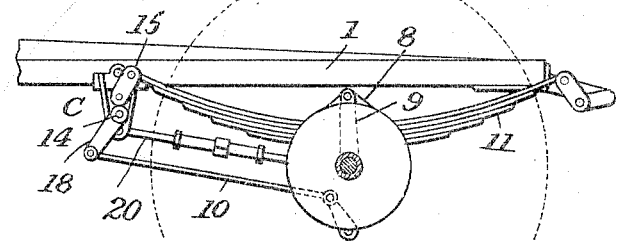
Figure 3:
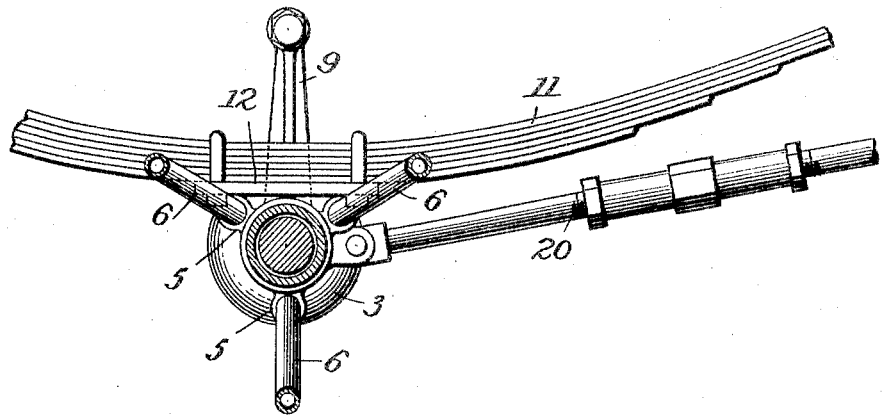
Figure 4:
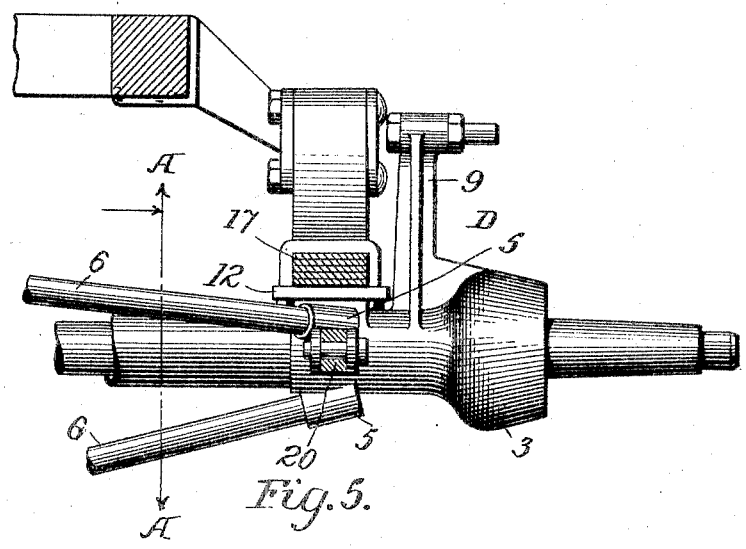
Figure 5:
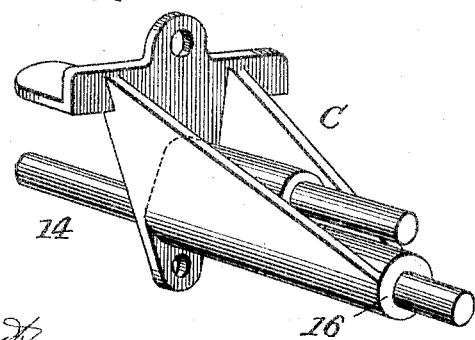

In the accompanying drawings, Figure 1 is a plan view of the rear end of a motor-vehicle frame having the present improvements applied thereto. Fig. 2 is a side elevation, partly in section, on the line B B of Fig. 1. Figs. 3, 4, and 5 are detail views on an enlarged scale, Fig. 3 being a section on the line A A of Fig. 4.

Referring to the drawings, in the several figures of which like reference characters designate corresponding parts, the side bars of the frame of the vehicle are designated by the reference character 1.

D designates suitable brackets or castings, each including a bearing 3 for a rear wheel 4 of the vehicle. Said brackets are also provided with suitable sockets 5 to receive brace-rods 6, which act to stiffen the rear axle and serve as supports for the equalizing-gear case 7. Brake-bands 8 are supported by arms 9, rising from the brackets D, and are suitably connected with forwardly-extending rods 10. The rear springs 11 of the vehicle are supported by plates 12 on said castings or brackets.

To the frame-bars 1, in advance of the brackets D, are attached brackets C, which support the forward ends of the springs 11, the brake-shaft 14, and to which the rear-axle brace-rods 20 are connected. Each of said brackets C supports a clevis 15, to which the forward end of one of the springs 11 is attached, and below the point of attachment of the clevis to the bracket is formed an extended bearing 16 for the brake-shaft 14. This shaft extends across the frame and is provided at its ends with arms 18, to which the forward ends of the rods 10 are secured. By means of a suitable power device (conventionally illustrated at 19) the said brake-shaft 14 can be rocked to apply or release the brakes, as desired. It will be seen that the shaft 14 serves to strengthen and stiffen the brackets C, which brackets support a considerable part of the weight of the machine. The brace-rods 20, connecting said brackets C D, prevent any fore-and-aft movement of the rear axle.

The present application is a division of my application, Serial No. 162,632, filed June 22, 1903, and no claim is herein made to any of the features illustrated in the accompanying drawings and specifically described and claimed in said earlier application.

Having thus described the invention and without intending to limit the claims to exactly the embodiment of the invention illustrated, what is claimed is—

1. In a motor-vehicle, the combination with the frame, the rear axle, and the rear springs, of a pair of brackets D each comprising a bearing for a rear wheel, a brake-supporting arm, a spring-supporting plate, and means for engaging the brace-rods for the rear axle.

2. In a motor-vehicle, the combination with the frame, the rear axle, and the rear springs, of a pair of brackets D each comprising a bearing for a rear wheel, a brake-supporting arm, a spring-supporting plate, sockets for receiving brace-rods for the rear axle, and a clevis for receiving a longitudinal brace.

3. In a motor-vehicle, the combination with the frame, the rear springs, the rear longitudinal brace, and the brake, of a pair of side brackets C, each bracket comprising a support for a spring-clevis, a bearing for the brake-shaft, and a connection for the longitudinal brace.

4. In a motor-vehicle, the combination with the frame, of a transverse brake-shaft, brackets secured to the frame and having elongated bearings for said shaft, springs supported on the rear axle and connected to said brackets, and longitudinal braces connected to said brackets and to the rear axle, the said brake-shaft serving to stiffen and strengthen said brackets.

In testimony whereof I have signed my name to this specification in the presence of two subscribing witnesses.

CHARLES SCHMIDT.

Witnesses:
 RUSSELL HUFF,
 HENRY B. JOY.